UNITED STATES PATENT OFFICE.

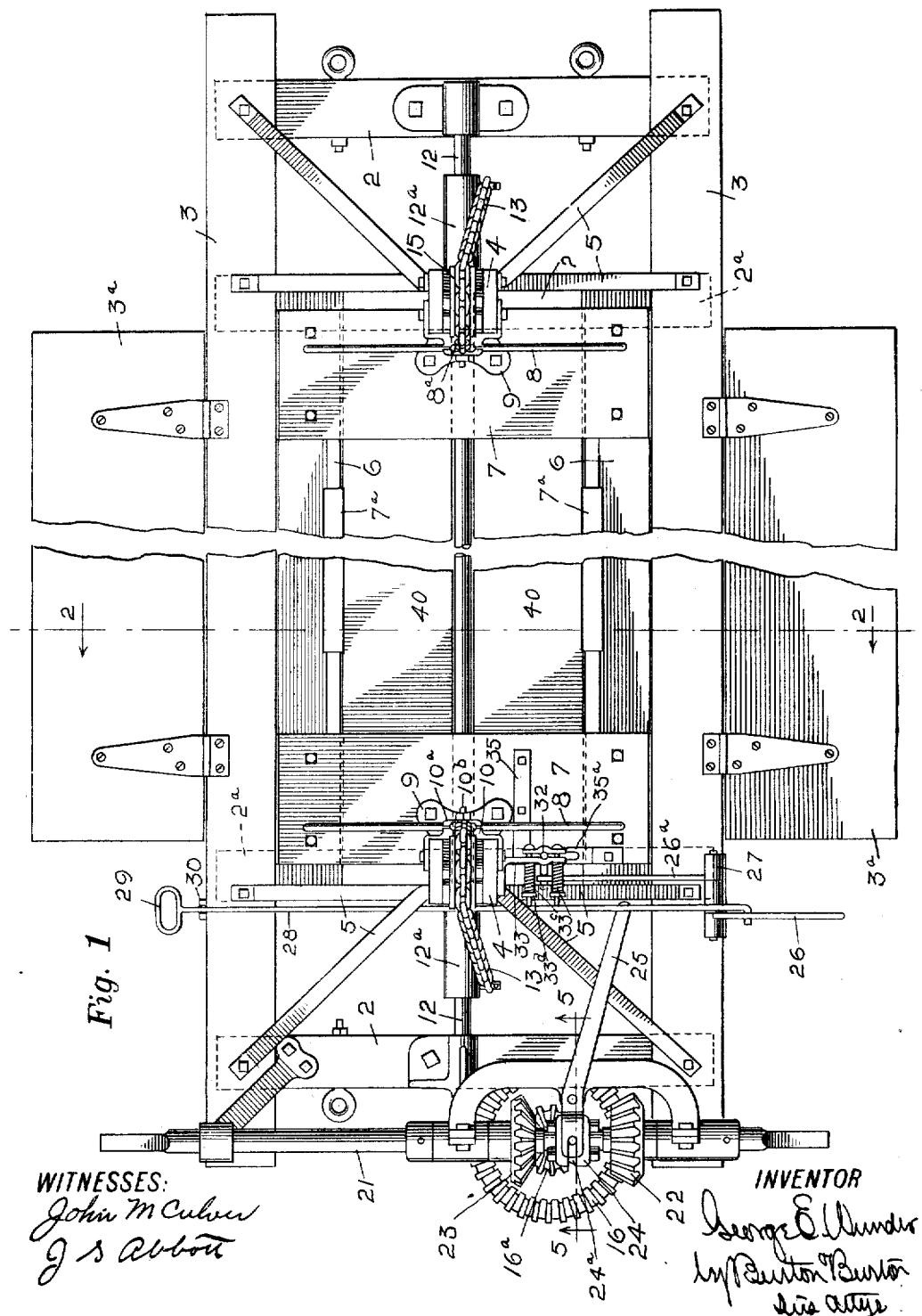

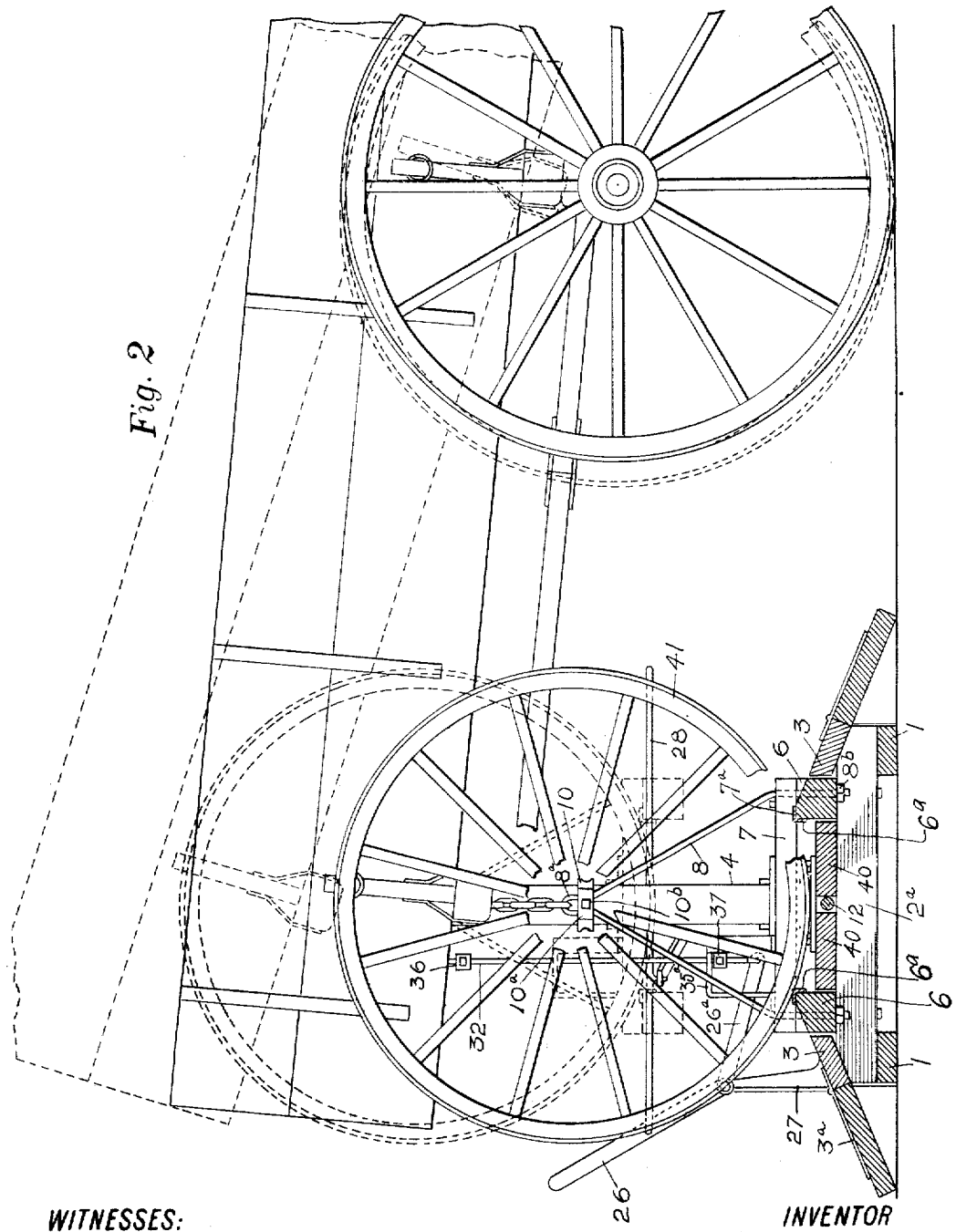

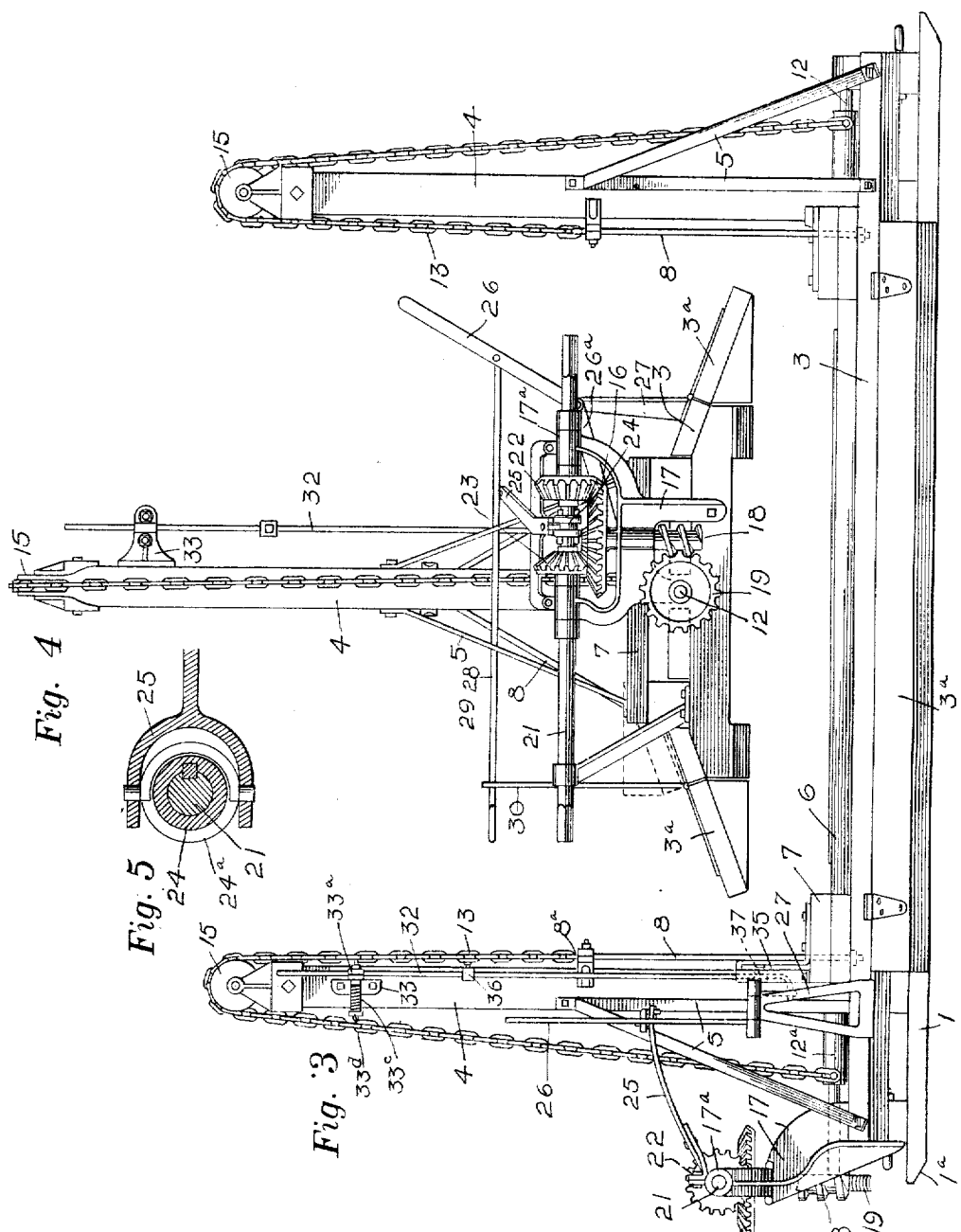

GEORGE E. WUNDER, OF MELVIN, ILLINOIS, ASSIGNOR TO INDEPENDENT HARVESTER COMPANY, OF PLANO, ILLINOIS, A CORPORATION OF MAINE.

WAGON-DUMPING APPARATUS.

947,318.  Specification of Letters Patent.  Patented Jan. 25, 1910.

Application filed September 24, 1908.  Serial No. 454,600.

*To all whom it may concern:*

Be it known that I, GEORGE E. WUNDER, a citizen of the United States, residing at Melvin, in the county of Ford and State of Illinois, have invented new and useful Improvements in Wagon-Dumping Apparatus, of which the following is a specification, reference being had to the accompanying drawings, forming a part thereof.

The purpose of this invention is to provide an apparatus by which a loaded wagon may be dumped by elevating bodily one end with the axle and wheels at that end so as to cause the load to be discharged by gravity from the other end of the wagon box.

It consists of the structure shown and described, as indicated in the claims.

In the drawings:—Figure 1 is a plan view of the apparatus involving this invention. Fig. 2 is a detail section at the line 2—2 on Fig. 1, with the addition of a side elevation of the wagon in position on the device shown in full lines before elevating, and in dotted lines after elevating, the axle and hub of the elevated wheels being broken away to disclose the lifting members. Fig. 3 is an end elevation of the structure shown in Fig. 1. Fig. 4 is a side elevation of the same. Fig. 5 is a detail section at the line 5—5 on Fig. 1.

The structure which is embodied in this invention comprises a frame designed to be locally fixed in operation, but movable from location to location as required for use. Such frame consists of a horizontally extended base resting on the ground; two rigid uprights spaced apart sufficiently for a roadway or wagon path between them; a wagon-lift consisting of a frame adapted to seat the pair of wheels which are to be lifted, and lifting connections from the two ends of such wagon lift extending over guides at the top of the standards and thence down to a windlass shaft by which they are wound for lifting; trains for rotating the windlass shaft in opposite directions, and clutch connections for shifting the power from one train to the other for lifting or lowering, as required. In connection with these principal elements the apparatus comprises devices for predetermining the height of lift for shifting the clutch when the limit of lifting or lowering movement is reached.

The base frame comprises transverse sills, 1, 1, connected by four longitudinal base girders, comprising extreme girders, 2, 2, near the ends of the sills, and intermediate girders, 2ª, 2ª, spaced apart the distance necessary for the wagon path. All of said girders are tied together by the transverse thresholds, 3, 3, lodged above the girders and inclined in the longitudinal direction of the apparatus,—that is, transversely of said thresholds, oppositely,—both sloping down outwardly, proper slope being produced by beveling the ends of the girders to form the seats for the thresholds, as seen in Fig. 2. To these fixed thresholds, 3, 3, there are hinged folding thresholds, 3ª, 3ª, of suitable width to extend in the longitudinal direction of the apparatus to the level of the lower surface of the base sills, 1, 1, so as to rest upon the ground or floor on which the latter may be supported. Upon each of the intermediate longitudinal girders, 2ª, there is erected an upright standard or post, 4, footed on the girder and stayed by braces, 5, extending in four directions to the fixed thresholds, 3. The lifting platform is a frame consisting of two transverse sills, 6, 6, crossed and connected by two longitudinal ties, 7, 7, lodged above the end portions of the sills and firmly bolted thereto. This frame is proportioned as to its longitudinal dimension so that it will enter between the proximate edges of the fixed sills, 3, 3, and as to its transverse dimension so that it will enter between the uprights, 4, 4, when the longitudinal ties, 7, 7, are notched at the middle point of their length to engage the posts as seen in Fig. 1. At each end of the lifting platform it is provided with a lifting bail, 8, formed of suitably heavy rod folded to form an eye or loop, 8ª, from which two arms diverge downwardly and are bent parallel at their lower ends to pass through the longitudinal ties, 7, and transverse sills, 6, below which the rods are threaded to receive nuts, 8ᵇ, which afford them engagement below the sills, 6. Two guide plates are provided for engaging the posts, one the plate, 9, which is bolted upon the upper surface of the longitudinal tie, 7, bounding the margin of the notch in the tie which accommodates the post, the other comprising two parts, 10 and 10ª, which are adapted to engage between them the loop, 8ª, of the bail, onto which they are clamped by the bolt, 10ᵇ, the member, 10, being bifurcated to engage or clasp one side of the post.

On the girders, 2, 2, there is journaled a transverse shaft, 12, having windlass enlargements, 12$^a$, 12$^a$, to which respectively there are connected lifting cables, 13, 13, extending from the windlasses respectively up outside the uprights, 4, and about guide-pulleys, 15, 15, to the top of the standards respectively, and down at the inner side to the bails, 8, 8, to which the cables respectively are connected at the loops or eyes, 8$^a$, of said bails. For rotating the windlass shaft, 12, to wind up the cables and thereby elevate the frame platform of the lift there is mounted upon one end of the base frame an operating train which comprises a horizontal bevel-gear having two banks of gear teeth, 16 and 16$^a$, whose vertical shaft is journaled in a bracket, 17, mounted on the girder, 2, the shaft having at the lower end a worm, 18, which engages a worm wheel, 19, on the windlass shaft, 12. A longitudinal power-communicating shaft, 21, is journaled in bearings, 17$^a$, on the bracket, 17, and between said bearings there are loose on said power-communicating shaft bevel gears, 22 and 23, meshing respectively with the bevel gear elements, 16 and 16$^a$, of the horizontal bevel gear.

Intermediate the two bevel gears, 22 and 23, on the shaft, 21, there is mounted and feathered for sliding on the shaft, rotating therewith, a clutch, 24, provided in a familiar manner at its opposite ends for engaging the hubs of the gears, 22 and 23, respectively which are correspondingly formed for such engagement,—that is to say, alternating segments of the hubs and the ends of the clutch facing them respectively being cut away for mutual engagement, as will be understood from Figs. 1 and 4. The bevel gears, 22 and 23, are spaced apart relatively to the length of the clutch, 24, so that the latter may stand between them disengaged from both, its movement in one direction from such intermediate position engaging one of the gears, and its movement in the opposite direction engaging the other. A shipping lever, 25, fulcrumed on the bracket, 17, is forked for engaging the annular groove, 24$^a$, of the clutch to shift it, as indicated. For shifting it at will there is provided a lever, 26, fulcrumed on a standard, 27, mounted on one of the fixed thresholds, 3; and an operating link connected to said lever, 26, extends across the machine longitudinally, being provided at the opposite end with a handle, 29, and a guide support, 30, mounted on the opposite threshold, 3, said operating link bar being intermediately connected with the lever, 25, which may be shifted by the operator either seizing the lever, 26, and rocking it, or the link bar, 28, and sliding it in its support, 30.

For operating the clutch automatically so as to arrest the hoisting and lowering action at the proper point there is provided a vertical bar, 32, guided for vertical movement on a bracket, 33, which is mounted near the upper end of one of the uprights, 4. This bar is connected at its lower end to the arm, 26$^a$, of the lever, 26, so that the longitudinal or up-and-down movement of the bar, 32, will operate the lever for shifting the clutch. A bracket, 35, mounted on the longitudinal tie, 7, of the platform frame of the lift has an offset arm or tappet, 35$^a$, through which the bar, 32, extends freely for sliding the bracket on the bar as the platform is raised and lowered. On the bar, 32, there are mounted two adjustable stops, 36, 37, one above and the other below the offset, 35$^a$, of the bracket, 35. The stop, 37, is designed to be secured on the bar at a position which will cause it to be encountered by the tappet, 35$^a$, upon the descent of the platform toward the lowest position, and enough before that lowest position is reached to cause the clutch to be shifted out of engagement with the bevel-gear,—that is, to the intermediate position,—at which it stands disengaged from both gears, 22 and 23. This causes the gears, 22 and 23 to come to rest, and the lowering movement to cease, upon the platform reaching the lowest position ready to receive the wagon wheels. The stop, 36, will be adjusted upon the bar, 32, so as to be encountered by the offset, 35$^a$, when the platform frame has been lifted to the height desired, thereby moving the clutch in the direction for disengaging it from the gear, 18, at that point. The power being communicated from the train to the windlass shaft by the engagement of the worm, 18, with the worm gear, 19, the platform is at all times safely locked against falling, because the pitch of the worm is not sufficient to communicate movement in the reverse direction,—that is, from the worm to the gear. When the train is at rest by reason of the disengagement of the clutch from both gear wheels, the operator can engage it for raising or lowering the platform, according to the position at which it stands, by shifting the clutch by means of the hand lever, 26, or link bar, 28, as described, the automatic devices being adapted only to disengage and not to engage the train.

In order to prevent the impact of the tappet against the stops from giving to the clutch and operating devices a momentum which will throw the clutch into engagement with the opposite wheel, from which it is to be disengaged by such encounter, the guide bracket, 33, of the bar, 32, is constructed for clamping the bar with a yielding pressure so as to frictionally resist the sliding movement and check it to prevent overthrow from momentum. It is for this purpose made of two members, the principal member bolted, as stated, to the post, and an outer member, 33ª, between which and the body of the bracket the bar, 32, is engaged for guidance, the outer member, 33ª, having stems which extend through the cross arm, 33ᵇ, of the main bracket member, on which are coiled springs, 33ᶜ, whose tension may be adjusted by check-nuts, 33ᵈ, applied on the ends of the stems.

The space between the transverse sills, 6, 6, of the lift platform is preferably closed, except as to the interval required for the shaft, 12, by planks, 40, 40, which are bolted to the intermediate sills, 2ª, 2ª, and thus extend under the ties, 7, 7, of the platform. The platform sills, 6, are preferably armored with angle iron, 6ª, to endure the wear of the wheels, 41, of the wagon. The hinged thresholds, 3ª, are designed to be folded up inward when the device is to be moved from place to place, and in order to facilitate transportation for short distances the sills, 1, 1, are preferably extended at both ends and beveled on the under side of the ends, as seen at 1ª, forming runners on which the device may be dragged over the ground.

I claim:—

1. A wagon-dumping apparatus comprising a platform adapted for seating one pair of the wheels of the wagon to be dumped; a hoisting mechanism for so operating the platform, the platform being adapted for the passage of the wagon thereacross in one direction; hoisting mechanism comprising a power shaft extending longitudinally with respect to the path of travel of the wagon across the hoisting platform; two gear wheels loose on said shaft; a shaft transverse to the power shaft having gears meshing respectively at opposite sides of the axis of said transverse shaft with said two gears on the power shaft for communicating to said transverse shaft rotation in opposite directions derived from the rotation of the power shaft in one direction; a clutch mounted on the power shaft for rotation therewith and movement therealong for engaging said two gears respectively at the opposite limits of such movement, the power shaft being extended in both directions from its bearings.

2. A wagon-dumping apparatus comprising a platform adapted for seating one pair of the wagon wheels to be dumped; a frame on which such platform is supported; hoisting mechanism for operating the platform, the frame being constructed to afford a path of travel for the wagon across the platform; a hoisting mechanism comprising a substantially horizontal power shaft extended both ways from its bearings for receiving power-operating connections; power-transmitting wheels on said shaft; a clutch on the shaft for connecting the wheels rotatively therewith, and power-transmitting trains connected with said wheels respectively for operating the hoisting mechanism in opposite directions.

3. A wagon-dumping apparatus, comprising a platform adapted for seating one pair of the wagon wheels; a frame comprising uprights between which such platform is positioned for rising and descending; hoisting mechanism carried by the frame; connections therefrom to the platform for lifting and lowering it, said mechanism comprising a disengageable clutch; a vertical element carried by the frame operatively connected with the clutch for shifting it; a tappet carried by the platform along such vertical element; stops on said element for encounter of the tappet, and friction slide bearings for said element; springs whose tension controls the friction, and means for adjusting the tension of the springs.

4. A dumping apparatus comprising a suspended support adapted for lodgment of one end of the structure which is to be dumped; a portable frame comprising an upright on which such support is suspended; hoisting mechanism carried by the frame, and connections therefrom to the suspended support for lifting and lowering it, said mechanism comprising a disengageable clutch; an element mounted for movement on the frame operatively connected with the clutch; means carried by the suspended support for actuating said element to shift the clutch; friction bearings for said element; springs whose tension controls the friction at such bearings and means for adjusting the tension of the spring.

In testimony whereof, I have hereunto set my hand at Paxton, Illinois, this 19 day of September, 1908.

G. E. WUNDER.

Witnesses:
R. L. SCHNEIDER,
C. L. SCHNEIDER.